United States Patent
Hortig et al.

(10) Patent No.: US 9,150,355 B2
(45) Date of Patent: Oct. 6, 2015

(54) TELESCOPING MECHANISM AND METHOD OF EXTENDING AND RETRACTING A TELESCOPING MECHANISM

(75) Inventors: Philipp J. Hortig, Rockford, MI (US); Pascal Rehm, Reinheim (DE)

(73) Assignee: Dematic Systems GbmH, Heusenstamm (DE)

(*) Notice: Subject to any disclaimer, the term of this patent is extended or adjusted under 35 U.S.C. 154(b) by 779 days.

(21) Appl. No.: 13/414,836

(22) Filed: Mar. 8, 2012

(65) Prior Publication Data
US 2012/0247239 A1    Oct. 4, 2012

Related U.S. Application Data

(60) Provisional application No. 61/471,358, filed on Apr. 4, 2011.

(51) Int. Cl.
| | |
|---|---|
| F16H 27/02 | (2006.01) |
| F16H 29/02 | (2006.01) |
| F16H 29/20 | (2006.01) |
| B65G 1/04 | (2006.01) |

(52) U.S. Cl.
CPC .......... B65G 1/0407 (2013.01); *Y10T 74/18848* (2015.01)

(58) Field of Classification Search
CPC ................................ B65G 1/04; B65G 1/0407
USPC ......... 74/490.04, 89.2, 89.21, 89.22; 414/280
See application file for complete search history.

(56) References Cited

U.S. PATENT DOCUMENTS

| | | | | |
|---|---|---|---|---|
| 2,859,629 | A | * | 11/1958 | Parker et al. ................. 74/89.22 |
| 3,010,328 | A | * | 11/1961 | Forey ................................. 74/110 |
| 4,161,004 | A | * | 7/1979 | Dalziel ........................... 360/267 |
| 4,388,003 | A | * | 6/1983 | Feller .............................. 374/41 |
| 4,988,262 | A | * | 1/1991 | Gines ............................ 414/662 |
| 5,015,140 | A | * | 5/1991 | Kling ............................ 414/282 |
| 5,207,555 | A | * | 5/1993 | Shirai ............................ 414/662 |
| 5,839,873 | A | * | 11/1998 | Lloyd et al. .................... 414/280 |

\* cited by examiner

*Primary Examiner* — Justin Krause
(74) *Attorney, Agent, or Firm* — Gardner, Linn, Burkhart & Flory, LLP

(57) ABSTRACT

A telescoping mechanism and method of extending and retracting a telescoping mechanism includes a first arm that extends in a particular direction with respect to a base, a second arm that extends in that direction with respect to the first arm, a first drive assembly that extends and retracts the first arm, and a second drive assembly that extends and retracts the second arm. The first drive assembly includes a rotatable drum and a cable. The cable is wrapped at least one turn around the drum. The cable has a first portion attached to one end portion of the first arm and a second end portion to an opposite end portion of the first arm.

17 Claims, 9 Drawing Sheets

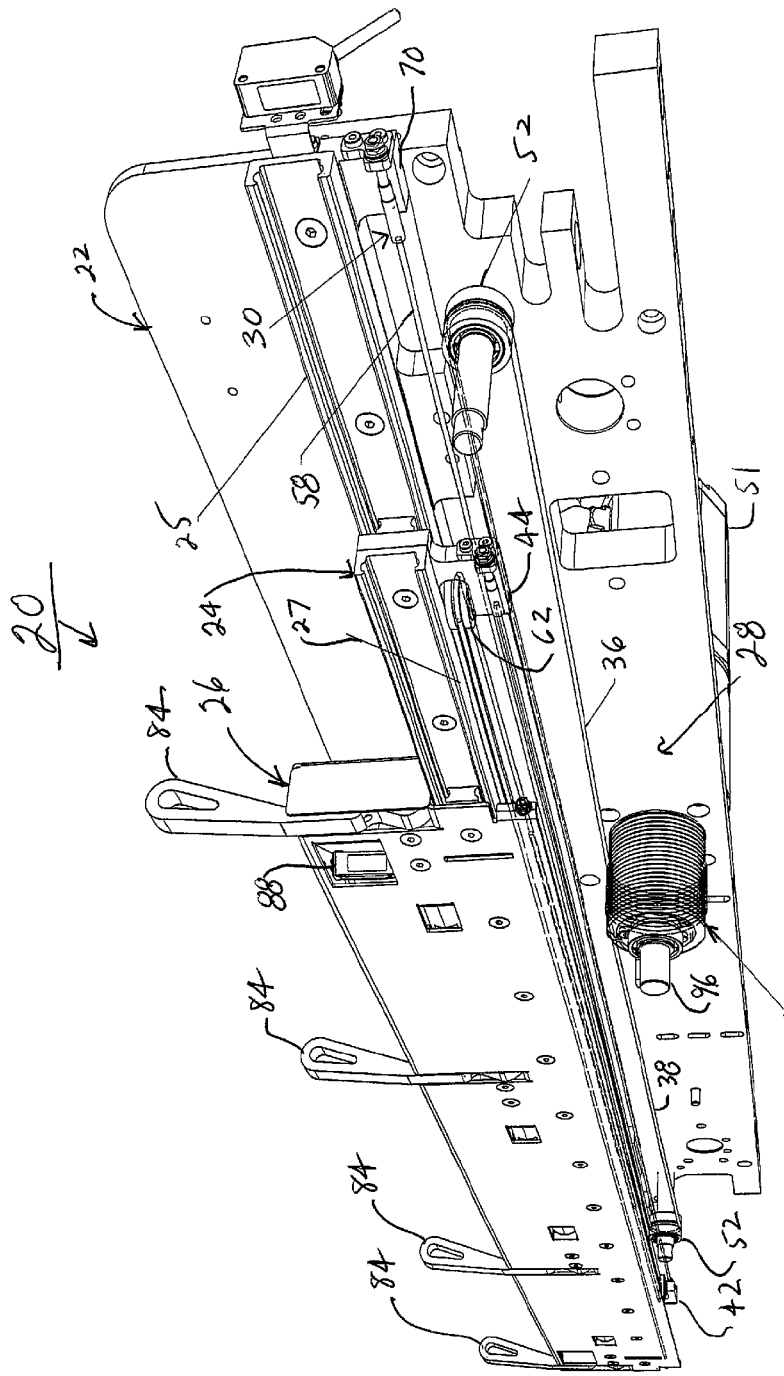

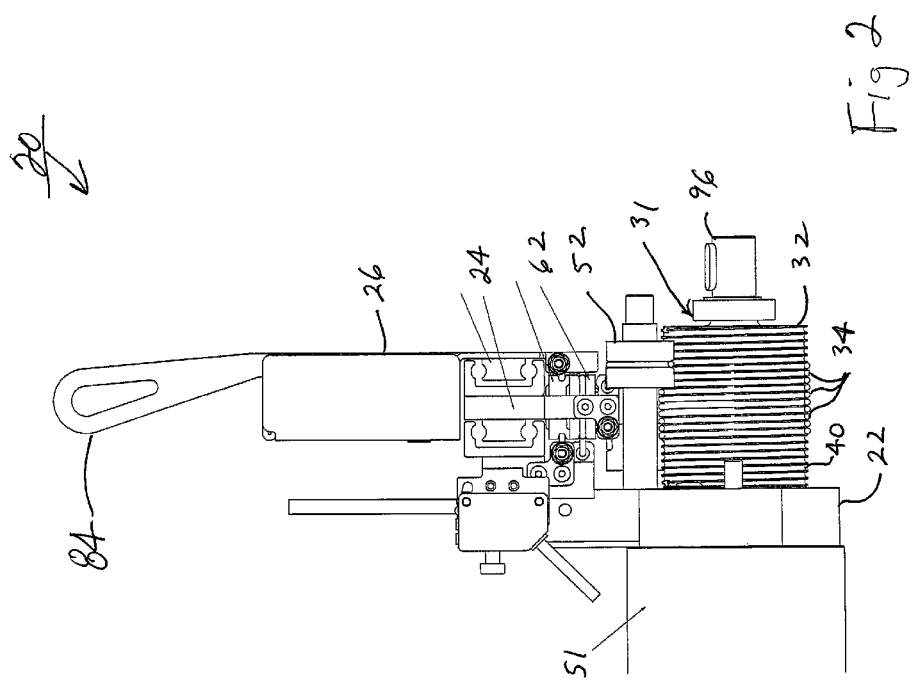

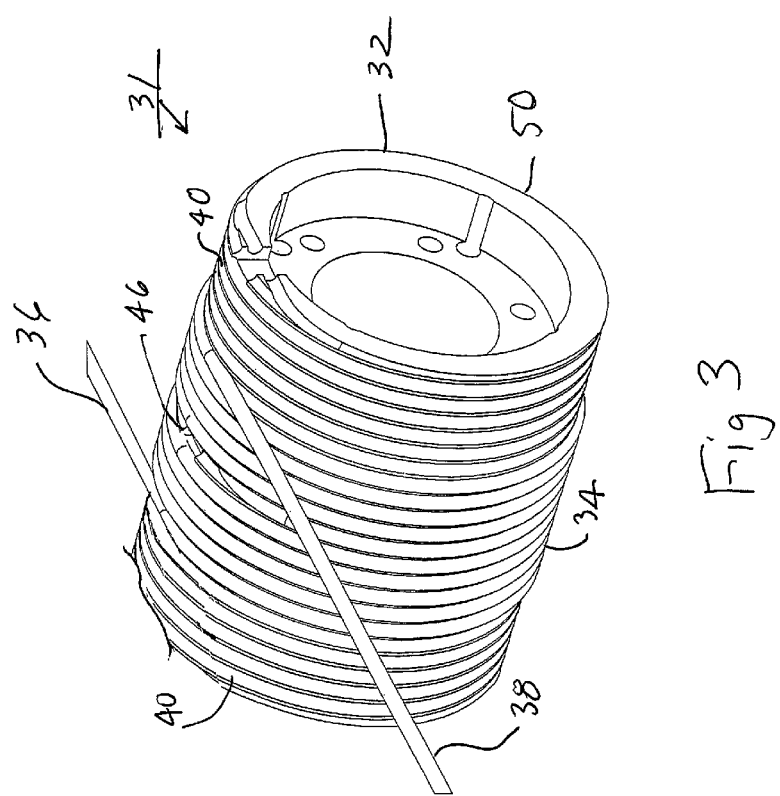

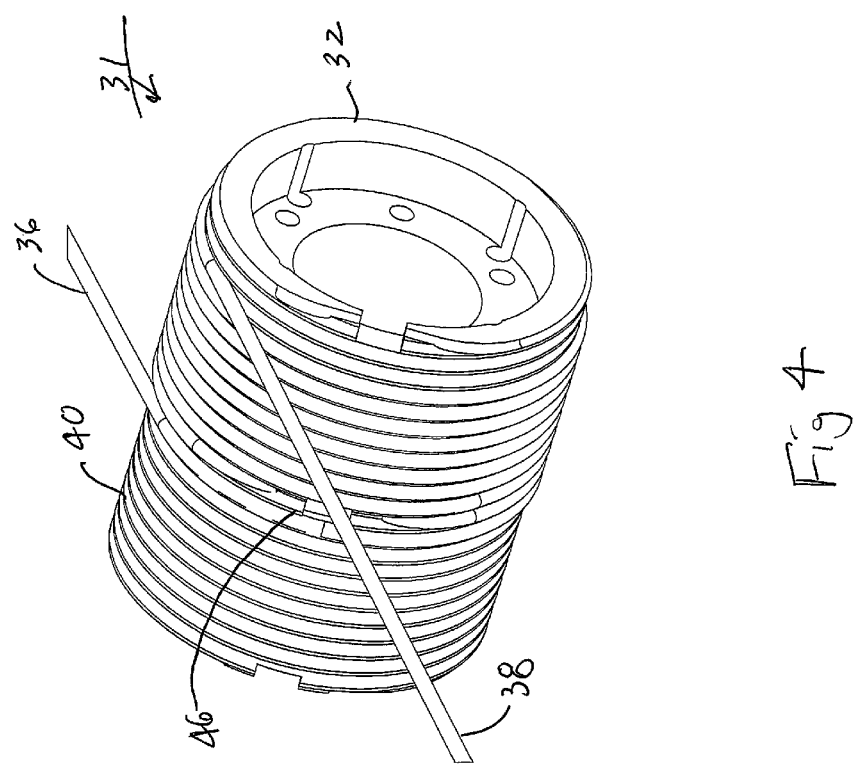

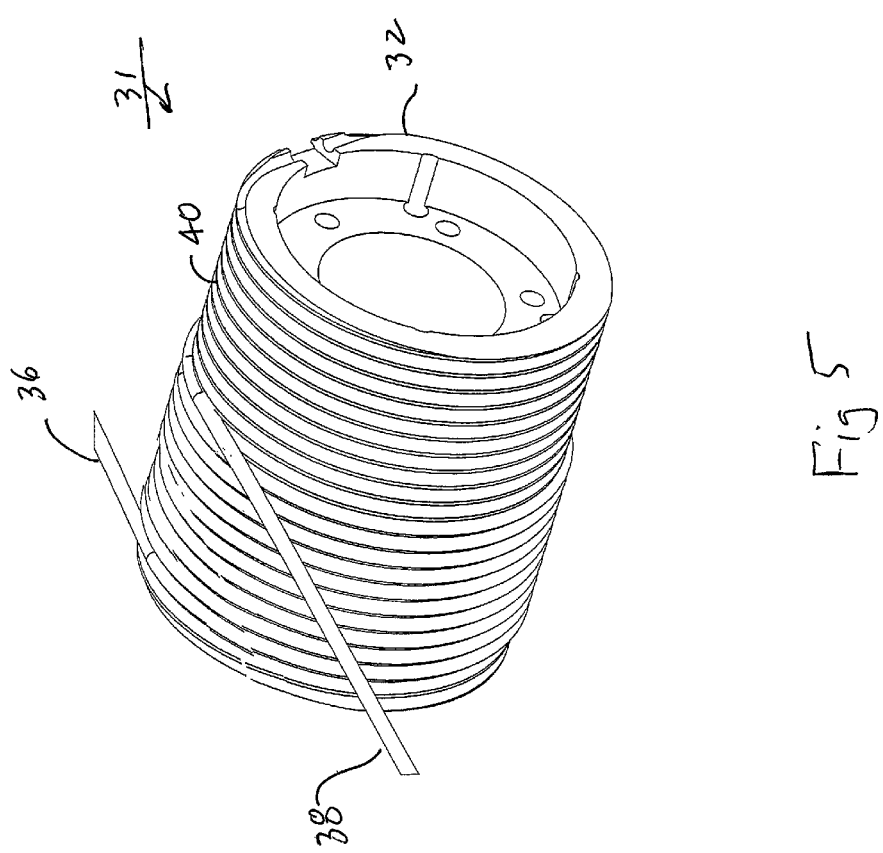

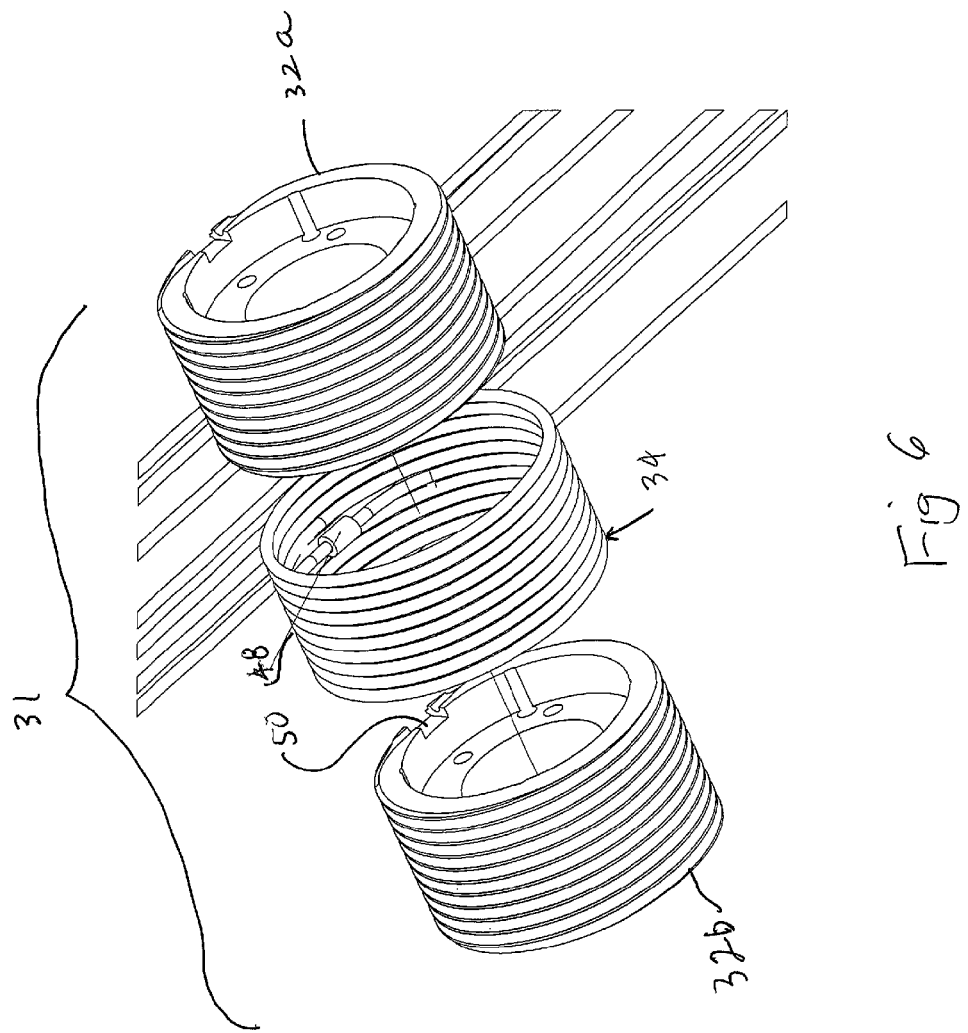

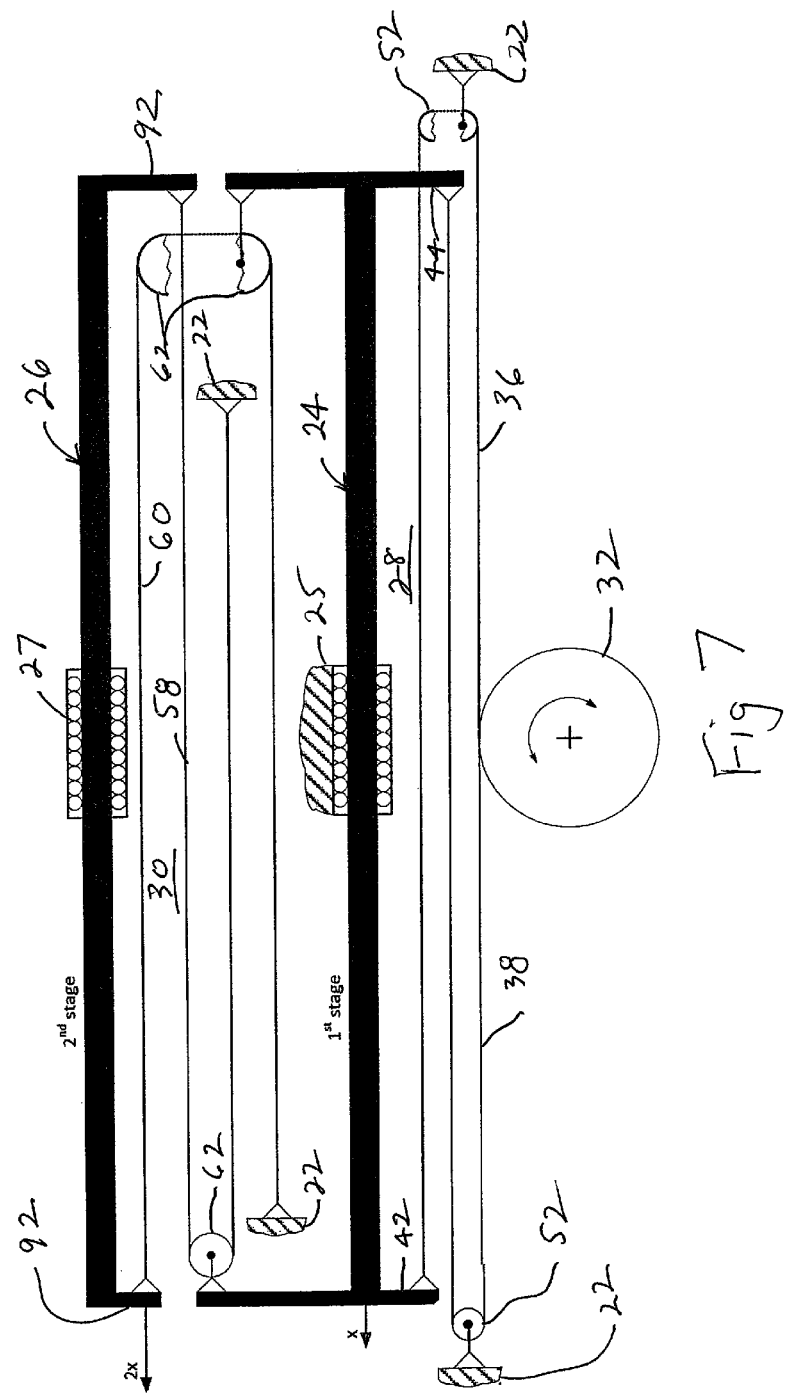

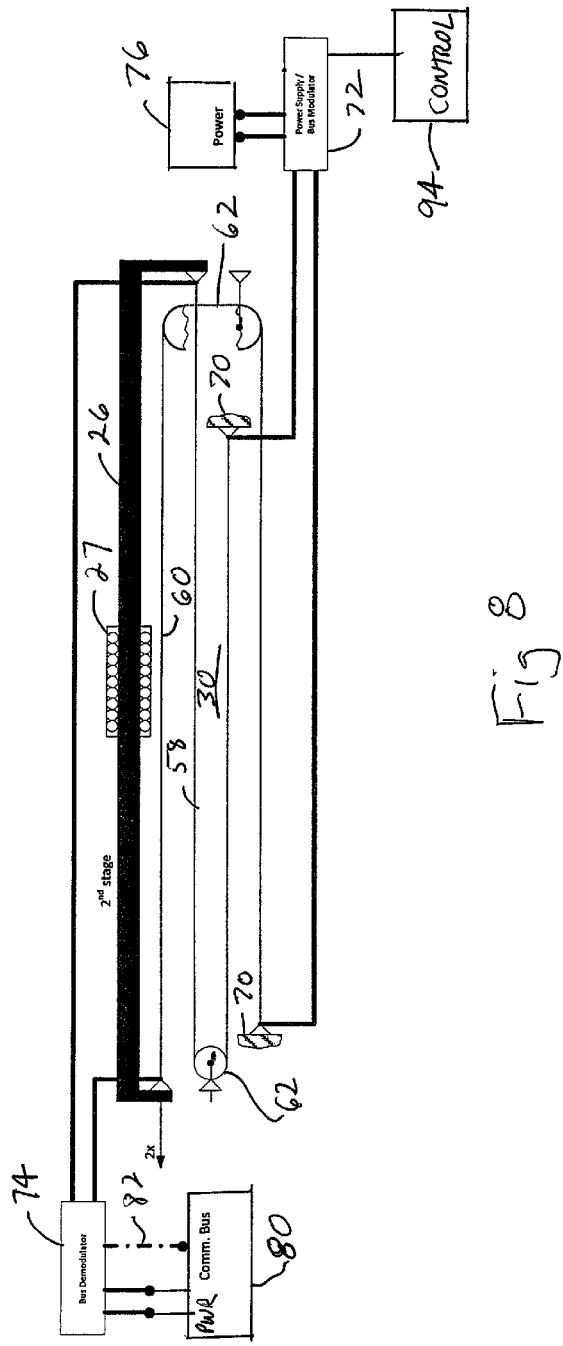

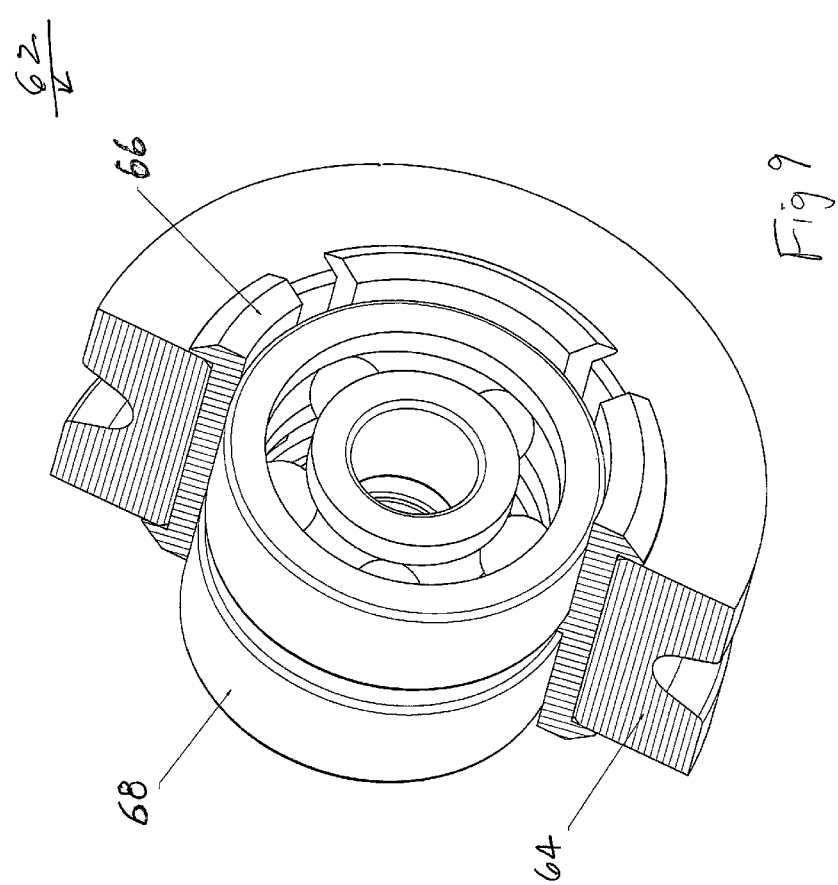

TELESCOPING MECHANISM AND METHOD OF EXTENDING AND RETRACTING A TELESCOPING MECHANISM

CROSS REFERENCE TO RELATED APPLICATIONS

This application claims priority from U.S. patent application Ser. No. 61/471,358 filed Apr. 4, 2011, the disclosure of which is hereby incorporated herein by reference in its entirety.

BACKGROUND OF THE INVENTION

The present invention is directed to a telescoping mechanism having a first arm that extends and retracts with respect to a base and a second arm that extends and retracts with respect to the first arm. The invention is particularly useful for such telescoping mechanism that is capable of extending and retracting in opposite directions. The invention is also particularly useful in applications requiring that electrical power and/or data be supplied to the second arm.

Certain applications, such as mobile shuttles that transfer articles to and receive articles from a shelf in a three-dimensional automated warehouse, require a pair of arms that are capable of extending in either direction with respect to an article carrying area on the shuttle in order to exchange an article between that article carrying area and a location on the shelf. In order to allow the arms to reach deep into the shelf, it is known to use multiple telescoping arms that extend and retract with respect to each other and with respect to the base. Also, it is known to supply electrical energy to operate electrical devices located on the telescoping arms.

SUMMARY OF THE INVENTION

The present invention is directed to a telescoping mechanism and method of extending and retracting such telescoping mechanism that provides multiple extending and retracting arms that provide superior functionality in a compact and robust design.

A telescoping mechanism and method of extending and retracting a telescoping mechanism, according to an aspect of the invention, includes a first arm that extends in a particular direction with respect to a base, a second arm that extends in that direction with respect to the first arm, a first drive assembly that extends and retracts the first arm, and a second drive assembly that extends and retracts the second arm. The first drive assembly includes a rotatable drum and a cable. The cable is wrapped at least one turn around the drum. The cable has a first portion attached to one end portion of the first arm and a second end portion to an opposite end portion of the first arm. In this manner, rotation of the drum causes one of said cable portions to wind onto the drum and the other of said cable portions to unwind from the drum to extend or retract the first arm.

The cable may be positively engaged at a center portion thereof to the drum. The cable may include an enlarged portion and the drum may include a void, wherein engagement of the enlarged portion with the void causes said cable to be positively engaged with the drum. The cable may be wrapped multiple turns around the drum. Each of the portions of the cable may extend around a respective direction reversing pulley.

The first arm may also be extendable with respect to the base in an opposite direction from the particular direction. The first portion of said cable may be substantially fully wrapped around the drum and the second portion of said cable be substantially fully unwrapped from the drum when said first arm is fully extended in one of the directions and the second portion of cable be substantially fully wrapped around the drum and said first portion of said cable be substantially fully unwrapped from the drum when the first arm is fully extended in the other direction.

Motion of the first arm with respect to the base may cause the second drive assembly to extend and retract the second arm with respect to the first arm. The second drive assembly may include a second cable attached between one end portion of the second arm and the base and a third cable attached between a second end portion of the second arm and the base, wherein the first arm engages the second and third cables in order to selectively propel those portions of the second and third cables attached to said second arm. The first arm may engage the second cable with a roller that changes the direction of motion of the second cable and changes the effective length of the second cable. The first arm may engage the third cable with another roller that changes the direction of motion of the third cable and changes the effective length of the third cable.

At least one of the second and third cables may be generally bare metal cables that are electrically insulated from the base and the first and second arms. The second and/or third cables may be attached to the base and the second arm with electrically insulated anchors. The first arm may engage the second and/or third cables with electrically insulated rollers. The insulated rollers may include metal spools that are separated from metal bearings with an electrically insulated insert.

A first circuit may be provided at the base to apply electrical power to the second and/or third cables and a second circuit at the second arm to apply electrical power from the second and/or third cables to one or more electrical devices at the second arm. The first and second circuits may exchange modulated data over the second and third cables. The electrical device(s) may include an extendable finger. A sensor may be provided that is adapted to sensing the extension state of the finger. The electrical device(s) may include an article sensor that is adapted to sense the presence of an article in the vicinity of the second arm.

The first and second arms may be linear slides. A motor may be provided to selectively rotate the drum. Mother telescoping mechanism may be provided that includes another first arm that extends in a particular direction with respect to the base, another second arm that extends in that direction with respect to the another first arm, another first drive assembly that extends and retracts the another first arm, and another second drive assembly that extends and retracts the another second arm. The another first drive assembly may include another rotatable drum with both rotatable drums being connected with a shaft wherein said drums are both rotatable in unison. The another first drive assembly may include another cable that is wrapped at least one turn around the another drum. The another cable may have a first portion attached to one end portion of said another first arm and a second end portion attached to an opposite end portion of the another first arm. In this manner, rotation of the another drum by the shaft causes one portion of the another cable to wind onto the another drum and the other of the portions of said another cable to unwind from the another drum to extend or retract the another first arm.

A telescoping mechanism and method of extending and retracting a telescoping mechanism, according to another aspect of the invention, includes a first arm that extends in a particular direction with respect to a base, a second arm that extends in that direction with respect to the first arm, a first drive assembly that extends and retracts the first arm, and a second drive assembly that extends and retracts the second arm. The second drive assembly includes one or more cables attached between the second arm and the base. The cable(s) is a generally bare metal cable that is electrically insulated from the base and the first and second arms.

The cable(s) may be attached to the base and the second arm with at least one electrically insulated anchor. The first arm may engage the cable(s) with at least one electrically insulated roller. The electrically insulated roller(s) may include a metal spool separated from a metal bearing with an electrically insulated insert.

A first circuit may be provided at the base and applying electrical power to the cable(s), and a second circuit may be provided at the second arm and applying electrical power from the cable(s) to at least one electrical device at the second arm. The first and second circuits may exchange modulated data over the cable(s). The electrical device(s) may include an extendable finger. A sensor may be provided that is adapted to sensing the extension state of the finger. The electrical device(s) may include an article sensor that is adapted to sense the presence of an article in the vicinity of the second arm.

The first and second arms may be linear slides. The at least one cable may be at least a pair of cables.

These and other objects, advantages and features of this invention will become apparent upon review of the following specification in conjunction with the drawings.

BRIEF DESCRIPTION OF THE DRAWINGS

FIG. 1 is a perspective view of a telescoping mechanism, according to an embodiment of the invention;

FIG. 2 is an end elevation of the telescoping mechanism in FIG. 1;

FIG. 3 is a perspective view of a winch shown with both cable portions partially wound on the rotatable drum;

FIG. 4 is the same view as FIG. 3 shown with one cable portion fully wound on the drum and the other cable portion fully unwound from the drum;

FIG. 5 is the same view as FIG. 3 shown with the one cable portion fully unwound from the drum and the other cable portion fully wound on the drum;

FIG. 6 is an exploded perspective view taken from below showing construction of the rotatable drum and cable;

FIG. 7 is a mechanical schematic diagram showing operation of the first and second drive assemblies;

FIG. 8 is an electrical schematic diagram showing use of the second drive assembly to exchange electrical power and data signals between the base and the second arm; and FIG. 9 is a perspective view of an electrically insulated roller with a portion removed to reveal internal details thereof.

DESCRIPTION OF THE PREFERRED EMBODIMENT

Referring now specifically to the drawings, and the illustrative embodiments depicted therein, a telescoping mechanism 20 is made up of a first arm 24 that extends in a particular direction with respect to a base 22, a second arm 26 that extends in the same direction with respect to first arm 24, a first drive assembly 28 that extends and retracts the first arm, and a second drive assembly 30 that extends and retracts the second arm. While telescoping mechanism 20 is capable of numerous uses, it is illustrated for use with a shuttle for an automated warehouse, or mini-load system, of the type disclosed in commonly assigned U.S. Patent Application Publication Nos. 2011/0008137 A1 and 2011/0008138 A1 and U.S. patent application Ser. No. 61/388,252, filed on Sep. 30, 2010, by Philipp J. Hortig et al., the disclosures of which are hereby collectively incorporated herein by reference in their entirety. Various embodiments of the invention may be used with other material-handling applications, which may include various forms of conveyor diverters, pushers, pullers, load-lifting devices, cranes, and the like.

In the illustrated embodiment, first arm 24 is a linear slide that is supported for linear movement with respect to base 22 on a slide bearing 25 and second arm 26 is a linear slide that is supported for linear movement with respect to first arm 24 on a slide bearing 27. Bearings 25, 27 are well known in the art and commercially available from various sources. Such linear slide arrangements are sometimes referred to as "drawer slides" due to their functional similarity to slides used to support drawers. However, in the illustrated embodiment, telescoping mechanism 20 is capable of extending selectively in opposite directions from base 22 in order to, for example, pick up or deliver an article to a shelf on both lateral sides of the shuttle (not shown) to which the telescoping mechanism(s) 20 are mounted.

In the illustrated embodiment, first drive assembly 28 includes a winch 31 made up of a rotatable drum 32 and a cable 34 wrapped at least one turn around drum 32. Cable 34 has a first portion 36 attached to one end portion 42 of first arm 24 and a second portion 38 attached to an opposite end portion 44 of first arm 24. In this manner, rotation of drum 32 in one rotational direction causes one of cable portions 36, 38 to wind onto the drum and the other of the cable portions 36, 38 to unwind from the drum to move first arm 24 in one direction to extend or retract the telescoping mechanism. Likewise, rotation of drum 32 in the opposite rotational direction causes the other of the cable portions 36, 38 to wind onto the drum and the one of the cable portions to unwind from the drum to move first arm 24 in the opposite direction to extend or retract the telescoping mechanism. Compare FIGS. 4 and 5.

Cable 34 is positively engaged at a center portion 46 to drum 32. This essentially eliminates the possibility of slip between the cable and the drum. This allows first arm 24 to be precisely positioned, such as with a DC servo motor 51 without the need for limit switches, and the like. This may be accomplished by cable 34 including an enlarged portion 48, formed with a crimp, or the like, that engages a void 50 in drum 32 to cause the cable to be positively engaged to the drum. Drum 32, which may be made up of identical joined halves 32a, 32b, further includes a spiral groove 40 to allow cable 34 to be wrapped multiple turns around drum 32. Spiral groove 40 is capable of fully winding both cable portions 36, 38, but not at the same time. This is because as one cable portion is being wound on the drum, the other one is being unwound from the drum.

Each cable portion 36, 38 extends around a respective direction reversing pulley 52. In this manner, the winding of a cable portion on drum 32 causes the end portion 42, 44 of first arm 24 to which that cable portion is attached to move toward the drum from a direction opposite to that which that cable portion is being wound onto the drum. This allows a full range of motion of first arm 24 in opposite directions.

In particular, the first cable portion 36 is substantially fully wrapped around the drum and the second cable portion 38 is substantially fully unwrapped from the drum when first arm 24 is fully extended in one direction, as illustrated in FIG. 5, and second cable portion 38 is substantially fully wrapped around drum 32 and first cable portion is substantially fully unwrapped from the drum when first arm 24 is fully extended in the other direction, as illustrated in FIG. 4.

Motion of first arm 24 with respect to base 22 causes second drive assembly 30 to extend and retract second arm 26 with respect to first arm 24 in the same direction that first arm 24 is extending or retracting. Second drive assembly 30 is made up of a cable 58 that is attached between one end portion 92 of second arm 26 and base 22. Second drive assembly 30 further includes a cable 60 attached between a second end portion 92 of second arm 26 and base 22. First arm 24 engages cables 58, 60 in order to selectively propel those portions of those cables attached to said second arm. More particularly, first arm 24 engages cable 58 with a roller 62 that changes the direction of motion of this cable and changes the effective length of this cable with respect to the first and second arms. First arm 24 engages cable 60 with another roller 62 that changes the direction of motion of this cable and changes the effective length of this cable with respect to the first and second arms. In this manner, the movement of the first arm in one direction with respect to the base causes twice the motion of the second arm in the same direction with respect to the base.

In the illustrated embodiment, cables 58, 60 are generally bare metal cables (i.e., non-insulated). However, cables 58, 60 are electrically isolated or insulated from base 24 and first and second arms 24, 26. This may be accomplished by cables 58, 60 being attached to base 24 and second arm 26 with electrically insulated anchors 70. Also, first arm 24 engages cables 58, 60 with electrically insulated rollers 62. Insulated anchors 70 are made up from threaded couplings that are swaged onto an end of a cable 58, 60 and engaging an opening in an insulted block. Insulated rollers 62 may be made up of spools 64 that are separated from bearings 68 by an electrically insulated insert 66 (FIG. 9). In this manner, spools 64 and bearings 68 may be made from metal while insert 66 avoids an electrical path from cable 58, 60 to the base or arm.

Because cables 58, 60 are electrically isolated from the other metal members, they are capable of conducting electrical power and/or data between base 24 and second arm 26. This not only allows electrical devices 80 on second arm 26 to be electrically operated, it also allows data to be collected at second arm 26 and supplied to base 24. A first circuit 72 is provided at base 24 that applies electrical power, such as low voltage DC power, from a power source 76 to cables 58, 60. A second circuit 74 at second arm 26 applies electrical power from cables 58, 60 to one or more electrical devices 80 at second arm 26. Circuits 72, 74 are also capable of exchanging modulated data in both directions over cables 58, 60. This allows multiple different loads to be selectively activated on second arm 26 from an electrical control 94 over a single pair of cables, using multiplexing techniques that are well known in the art. It also allows data to be returned from electrical devices 80 on second arm 26 to electrical control 94 in order to obtain intelligence from such devices. Circuits 72, 74 can be any known bus modulator/demodulator circuits that are commercially available from various sources.

While both cable 58 and 60 are illustrated as being electrically isolated from the first and second arms and the base, it should be understood that it may be possible to electrically isolate only one of the cables from the metal members and use the other cable as an electrical ground that connects electrically with the metal members. Also, if the second drive assembly has a different configuration requiring a single cable to move the second arm, it may be possible to electrically insulate that single cable for the purpose of supplying power to the second arm and exchanging data, and use the metal composition of the first and second arm to act as a return ground path to the base as would be understood by the skilled artisan. In the illustrated embodiment, cables 34, 58 and 60 are made from 2.0 millimeter stranded stainless steel wire that is bare.

In the illustrated embodiment, electrical device 80 may be one of a series of extendable fingers 84 that operate according to the general principles set forth in U.S. Patent Application Publication No. 2011/0008138 referred to above. In the illustrated embodiment, fingers 84 may be motor-operated and include a sensor (not shown) that is adapted to sense the extension state of the associated finger 84. This allows control 94 to have confirmation that the finger is in the state that is intended. Electrical device 80 may be an article sensor 88 that is adapted to sense the presence of an article in the vicinity of said second arm 26. This allows control 94 to confirm that the shelf is either occupied or empty before attempting to place an article to that shelf or retrieve an article from that shelf. Other electrical devices may be used as well as would be apparent to the skilled artisan.

A second telescoping mechanism (not shown) may be operated from a common motor 51. This may be accomplished by extending a shaft 96 between rotatable drum 32 of both telescoping mechanisms. When motor 51 rotates one drum, the other drum rotates in synchronism therewith. This allows a pair of arms to be extended and retracted in opposite directions in order to carry out the functions described in U.S. Patent Application Publication No. 2011/0008138. If a pair of telescoping mechanisms are mounted in a manner that spacing between the arms can be adjusted, as described in U.S. patent application Ser. No. 61/388,252, filed on Sep. 30, 2010, by Philipp J. Hortig, shaft 96 may be a splined shaft so that one of the drums 32 may slide along the shaft in order to adjust the spacing between the telescoping mechanisms.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A telescoping mechanism, comprising:
   a first arm that extends in a particular direction with respect to a base;
   a second arm that extends in said particular direction with respect to said first arm;
   a first drive assembly that extends and retracts said first arm; and
   a second drive assembly that extends and retracts said second arm;
   wherein said first drive assembly comprises a rotatable drum and a cable, said cable wrapped at least one turn around said drum, said cable having a first portion attached to one end portion of said first arm and a second end portion to an opposite end portion of said first arm, wherein rotation of said drum causes one of said cable portions to wind onto said drum and the other of said cable portions to unwind from said drum to extend or retract said first arm wherein said cable is positively engaged at a center portion thereof to said drum wherein said cable includes an enlarged portion and wherein said drum includes a void wherein engagement of said engaged portion with said void causes said cable to be positively engaged with said drum.

2. The telescoping mechanism as claimed in claim 1 wherein said cable is wrapped multiple turns around said drum.

3. The telescoping mechanism as claimed in claim 1 wherein each of said portions of said cable extends around a respective direction reversing pulley.

4. The telescoping mechanism as claimed in claim 1 wherein said first arm is also extendable with respect to said base in an opposite direction from said particular direction.

5. The telescoping mechanism as claimed in claim 4 wherein said first portion of said cable is substantially fully wrapped around said drum and said second portion of said cable is substantially fully unwrapped from said drum when said first arm is fully extended in one of said directions and wherein said second portion of said cable is substantially fully wrapped around said drum and said first portion of said cable is substantially fully unwrapped from said drum when said first arm is fully extended in the other of said directions.

6. The telescoping mechanism as claimed in claim 1 wherein motion of said first arm with respect to said base causes said second drive assembly to extend and retract said second arm with respect to said first arm.

7. The telescoping mechanism as claimed in claim 1 wherein said second drive assembly comprises a second cable attached between one end portion of said second arm and said base and a third cable attached between a second end portion of said second arm and said base, wherein said first arm engages second and third cables in order to selectively propel those portions of said second and third cables attached to said second arm.

8. The telescoping mechanism as claimed in claim 7 wherein said first arm engages said second cable with a roller that changes the direction of motion of said second cable and changes the effective length of said second cable and wherein said first arm engages said third cable with another roller that changes the direction of motion of said third cable and changes the effective length of said third cable.

9. The telescoping mechanism as claimed in claim 8 wherein at least one chosen from said second and third cables is a generally bare metal cable that is electrically insulated from said base and said first and second arms.

10. The telescoping mechanism as claimed in claim 9 wherein said at least one chosen from said second and third cables are attached to said base and said second arm with electrically insulated anchors.

11. The telescoping mechanism as claimed in claim 10 wherein said first arm engages said at least one chosen from said second and third cables with electrically insulated rollers.

12. The telescoping mechanism as claimed in claim 11 wherein said insulated rollers comprise metal spools separated from metal bearings with an electrically insulated insert.

13. The telescoping mechanism as claimed in claim 12 including a first circuit at said base applying electrical power to said at least one chosen from said second and third cables and a second circuit at said second arm applying electrical power from said at least one chosen from said second and third cables to at least one electrical device at said second arm.

14. The telescoping mechanism as claimed in claim 13 wherein said first and second circuits exchange modulated data over said at least one chosen from said second and third cables.

15. The telescoping mechanism as claimed in claim 14 wherein said at least one electrical device comprises an extendable finger.

16. The telescoping mechanism as claimed in claim 15 including a sensor that is adapted to sensing the extension state of said finger.

17. A telescoping mechanism, comprising:
- a first arm that extends in a particular direction with respect to a base;
- a second arm that extends in said particular direction with respect to said first arm;
- a first drive assembly that extends and retracts said first arm; and
- a second drive assembly that extends and retracts said second arm, wherein said second drive assembly comprises at least one cable attached between said second arm and said base, wherein said at least one cable is a generally bare metal cable that is electrically insulated from said base and said first and second arms.

* * * * *